Dec. 16, 1952      H. S. RHODES      2,621,884
CHARGE MEASURING DEVICE
Filed Oct. 21, 1947      4 Sheets-Sheet 1
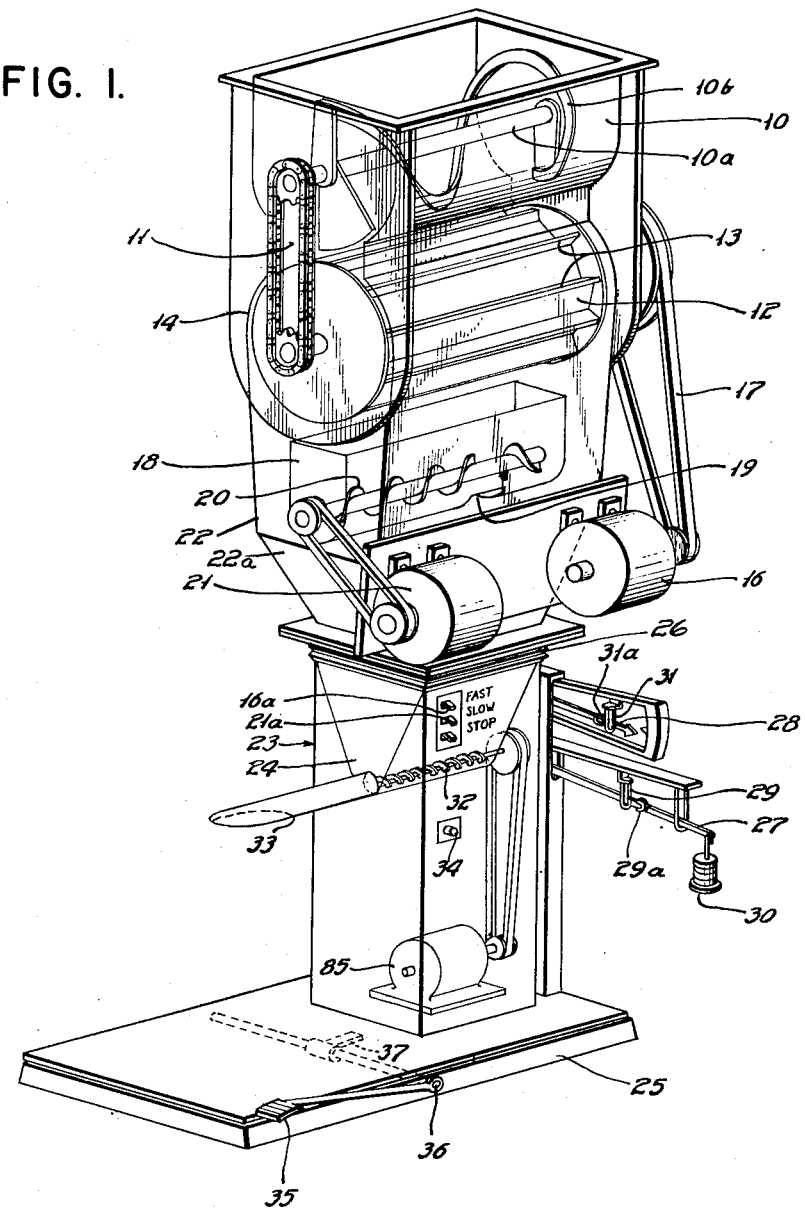
FIG. I.
INVENTOR
HERMAN S. RHODES
BY Ward, Crosby & Neal
ATTORNEYS

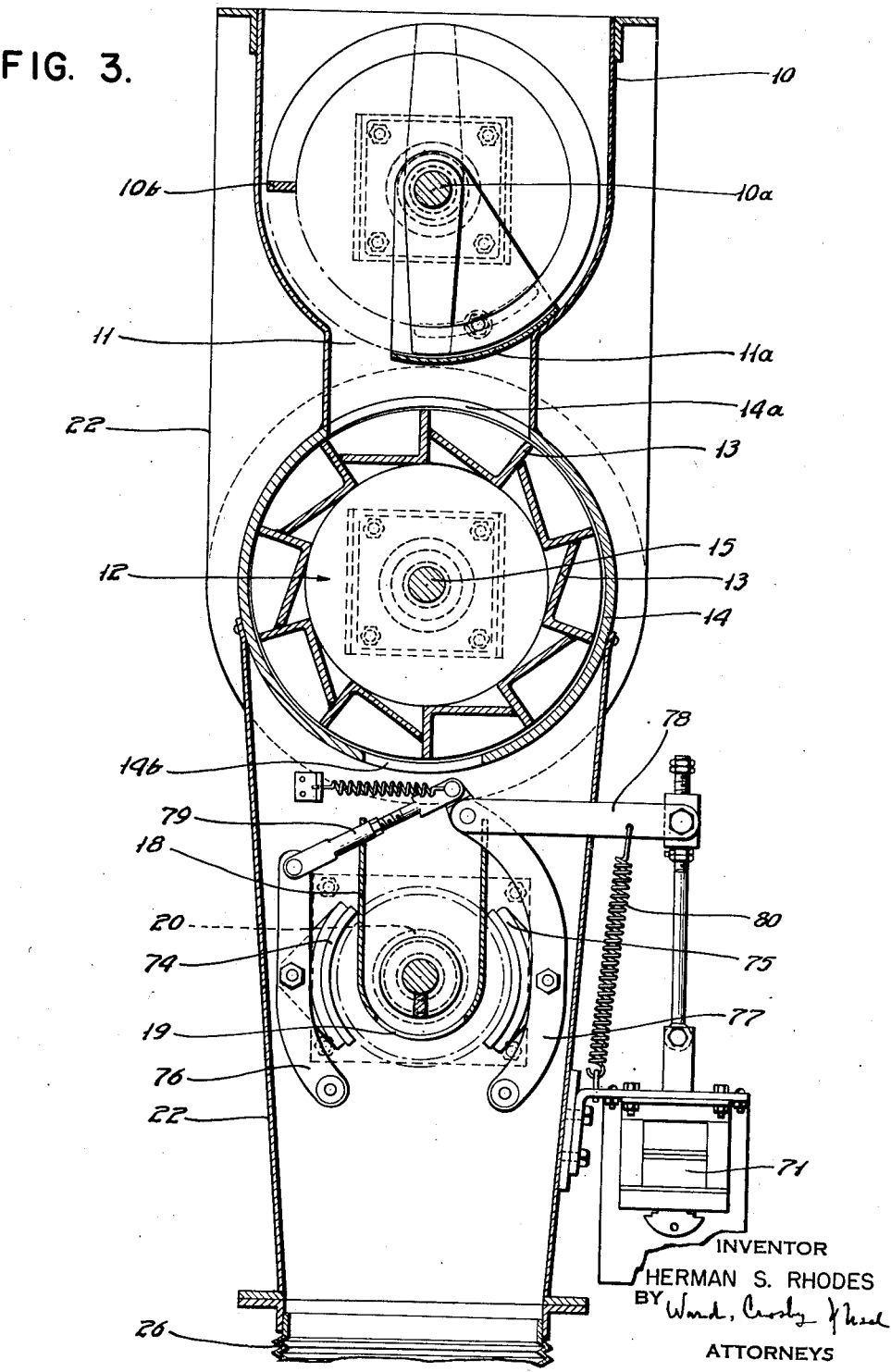

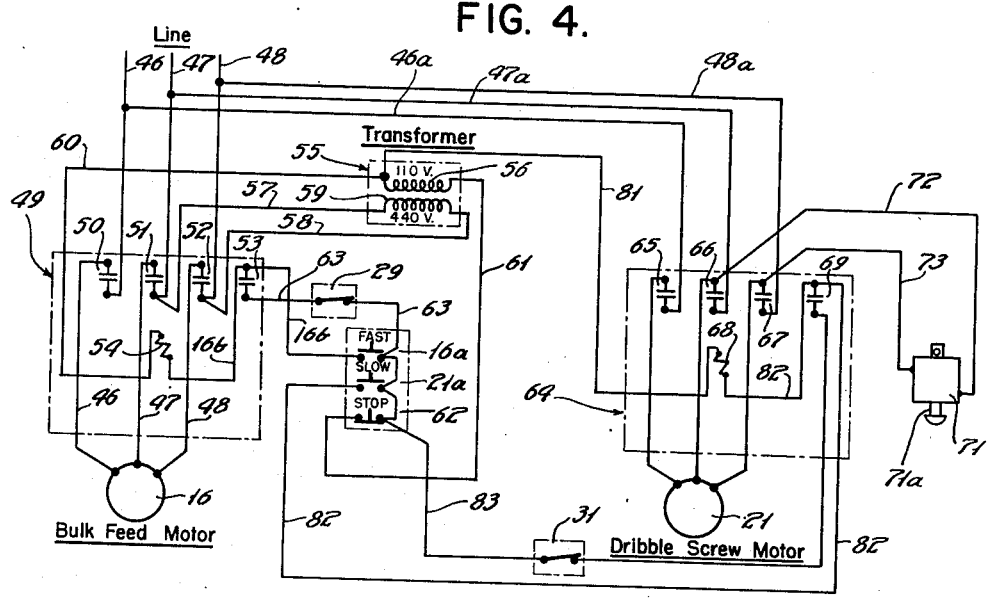

Dec. 16, 1952   H. S. RHODES   2,621,884
CHARGE MEASURING DEVICE
Filed Oct. 21, 1947
4 Sheets-Sheet 4

Inventor
HERMAN S. RHODES
Ward, Crosby & Reed
Attorneys

Patented Dec. 16, 1952

2,621,884

UNITED STATES PATENT OFFICE 2,621,884

CHARGE MEASURING DEVICE

Herman S. Rhodes, Birmingham, Ala., assignor to St. Regis Paper Company, New York, N. Y., a corporation of New York Application October 21, 1947, Serial No. 781,239

16 Claims. (Cl. 249—15)

This invention relates to bag filling apparatus, and more particularly to means for measuring a charge for a container.

Devices have heretofore been proposed for measuring a charge, for example, for a bag or container, which devices have measured first a bulk charge at an accuracy of relatively low degree, and thereafter a dribble charge measured at a higher degree of accuracy has been added to the bulk charge in order to bring the weight of the total charge up to a desired accurate point. Serious difficulties have been encountered by prior devices in measuring the dribble charge because at the outset of each dribble operation a different head of material exists in a supply bin from which the dribble charge flows. This lack of uniformity in head has been detrimental to the accuracy of the weight of the final charge and his diminished the accuracy of all charge weighing apparatus operating under such circumstances. This problem has not heretofore been solved. More particularly, suitable means have not in the past been devised for "dribbling in" the dribble charge without being influenced by such a variable head.

Moreover, it is desirable to control a bulk feed in such a manner that predetermined increments of material be fed to the weighing device at a predetermined rate whereby said device is not suddenly flooded. That is, a sufficiently large but closely controllable flow of material should be moved by the charge measuring means in such a manner that the bulk charge can be measured within a short time, and supplemented by a dribble charge of controlled rate of flow which also should be added and weighed within a short time, thus permitting a large output of filled containers per hour.

According to the present invention, apparatus is provided for overcoming the above difficulties.

Various further and more specific objects, features and advantages of the invention will clearly appear from the detailed description given below taken in connection with the accompanying drawings which form a part of this specification and illustrate, by way of example, preferred arrangements of apparatus for carrying out the invention. The latter consists in such novel combinations of features and apparatus as may be shown and described in connection with the device herein disclosed.

In the drawings:

Fig. 1 is a perspective phantom view illustrating one embodiment of the invention;

Fig. 2 is an enlarged detail view of a switch which may be employed with the present invention;

Fig. 2a illustrates an operative interconnection between two weight responsive arms employed in a scale for measuring a charge of material;

Fig. 3 is an end view partly in section and with parts broken away of the feeder portion of the apparatus shown in Fig. 1;

Fig. 4 is a schematic wiring diagram illustrating one plan for interconnecting the various electrically operable parts of the invention.

Figure 5:
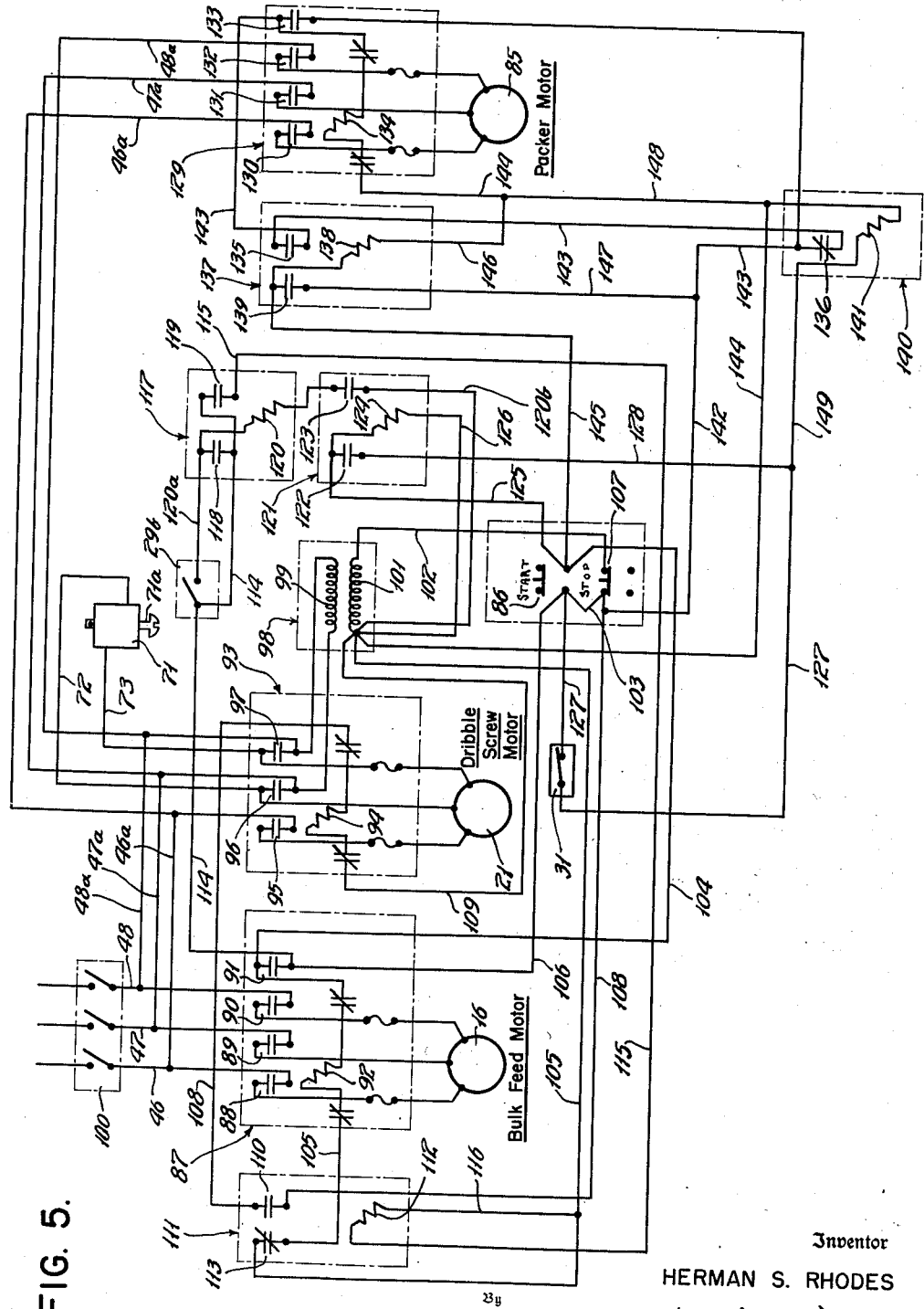
Fig. 5 is a schematic wiring diagram illustrating a second plan for interconnecting the electrically operable parts of the invention.

The novel apparatus comprises a charge measuring device which is constituted by a feeder and a suitable scale having a receptacle onto which the feeder controls a flow of material such as sugar. A packer for a valve bag can be mounted on the scale and said material can be fed directly into the packer and thence into the bag.

The novel charge measuring device is distinct from apparatus heretofore suggested, among other reasons, because of the novel method and means by which a dribble charge is accumulated and fed by a feeder apparatus onto a scale. A bulk stream of material is allowed to fall from a supply bin towards a scale therebeneath. This stream is controlled by means of a novel valve device to appear more fully hereinafter. An open mouth trough or container is interposed in the path of this stream, becomes filled, and overflows. The portion of the stream which is not caught and held by the trough at this stage constitutes the bulk stream. The stream is arrested, by means of said novel valve device, when the initial or bulk charge has reached a predetermined weight.

The term "bulk charge" as employed herein indicates a charge which may vary from about 90 to 98 per cent of the total. In the present embodiment the bulk charge varies from about 94 to 96 per cent of the total, and the dribble charge, of course, comprises the balance.

Thereafter, the dribble charge is fed to the scale from the filled trough or container. The latter is provided with means for feeding the contents thereof slowly, preferably from an outlet in the bottom thereof. The pressure or head of material at the outlet thus is always the same at the start of each dribble operation and will diminish in a predictable manner thereafter.

The unique feature of the means for dribbling out the contents of the trough or container after the bulk stream has been interrupted is that a final weight of material can be dribbled onto a scale without being influenced by a main supply of material, for example, as exists in a main supply bin. Thus a uniform head is assured at the commencement of each dribble operation. Of course, as material is dribbled from the container, the head therein may gradually diminish but the reduction in the head is easily predictable and is a function of the speed with which the material is removed from the container. The serious disadvantages of wide variations in head thus are completely avoided and a dribble flow is obtainable having little or no fluctuations which are attributable to a variation in initial head.

Referring to the drawings in further detail, a bin or hopper for holding a supply of material such as sugar is provided as at 10. The latter is provided with a suitable outlet at 11 through which the material may flow. An adjustable gate 11a is angularly shiftable to provide a rough control of the stream through outlet 11. Gate 11a is movable about the axis of a shaft 10a of an agitator having a spiral agitating arm 10b.

The above-mentioned flooding of the weighing device might easily occur, when measuring many types of materials such as sugar, if the flow thereof from the bin 10 were controlled solely by the adjustable gate 11. Consequently it has been found desirable to fix the gate 11 at a desired position and to employ the novel valve apparatus described below, which feeds predetermined increments of material successively to the packer in such a manner that said danger of flooding is eliminated. The novel valve apparatus is hereinafter referred to as a "vaned spider valve" or vaned spider or "vaned feeder." In the form shown, it is constituted by a cylinder having longitudinal vanes, the cylinder being rotatable within a close fitting stationary housing. Material is fed to the top of the housing where it falls into pockets formed by successive vanes and is moved by rotation of the cylinder to an outlet in the bottom of the housing through which it falls.

A vaned spider valve is indicated at 12 and comprises, for example, a cylinder having longitudinal vanes or angle members 13 secured to the surface thereof in such a manner that the longitudinal axes thereof are parallel to the axis of the cylinder. The angle members 13 are secured adjacent one another as shown in Figs. 1 and 3. A suitable housing 14 surrounds the vaned spider 12 and is provided with two openings 14a and 14b. The former is in register with the outlet 11 of the bin 10, and the latter (preferably beneath the former) constitutes a suitable outlet for the stream of material which is moved by the spider 12.

The cylindrical spider 12 is rotatably mounted upon a suitable shaft 15 which is driven by, for example, an electric motor 16 (Fig. 1) through the intermediary of well known means such as a chain or belt drive 17.

The vaned spider thus constitutes a rotating seal which prevents material from flooding from bin 10 and thus maintains a positive control over the flow of material therefrom.

A stream of material thus emanates from the outlet 14b. In order to build up or to gather in a quantity of material from which a dribble charge may be formed, a container such as a trough 18 is placed in the path of the stream emanating from outlet 14b, and is filled. In the particular form shown, said stream of material is momentarily at least partially interrupted by the container. When the trough 18 becomes full or when the level thereof has reached a point at least substantially equal to that of the inlet into which the stream of material is fed, then an overflowing will occur. The material not caught by the container, including the overflow therefrom constitutes the bulk flow.

The container or trough 18 is preferably beneath and in spaced relation to the outlet 14b. The distance between the outlet 14b and the trough should be sufficient to permit an unobstructed overflow from the trough. The inlet or opening in the trough preferably is at the top thereof, as shown in Fig. 1. However, it is possible to feed a stream of material into an opening which need not necessarily be at the top of the container.

The trough 18 is provided with an outlet 19 which preferably is in the bottom thereof and through which material in the trough is moved by means, for example, of a screw arrangement. Such a screw is illustrated at 20 and may be rotated, for example, by means of an electric motor 21 through the intermediary of a conventional chain or belt. The opening 19 is intermediate the extremities of the trough 18, thus making it desirable for the pitch of the screw 20 to be disposed so that material upon the right side of the opening (as viewed in Fig. 1) will be moved to the left toward the opening 19, and material to the left of the opening will be moved to the right and thence to said opening. Thus the pitch of the screw to the left of the opening will be opposite to the pitch of the screw which is to the right of the opening.

As above mentioned, the material not caught by the trough 18 constitutes a bulk flow and builds up a bulk charge. This bulk flow, of course, is rapid and relatively heavy as compared to the dribble flow from the trough. After the above charge has been formed, the bulk flow is interrupted and the material in the trough 18 is slowly dribbled therefrom by means of the screw 20. The dribble flow, of course, is relatively of a small volume and is relatively slow as compared to the bulk flow.

A suitable outer housing 22 is provided for enclosing the vane spider valve 12, 14 and the trough 18, and is directed toward a packer 23 from which the weighed charge is fed into a container such as a paper bag. The packer 23 is provided with a hopper 24 therein and the entire packer 23 is supported upon a scale 25 by which the charge (bulk and dribble) may be weighed.

The feeder portion of the apparatus comprising the supply bin, the spider, the trough, and the means for actuating same is preferably mounted separately from the packer in order to permit the latter to have free weighing movement. To this end, a flexible passageway 26 is provided for connecting the housing 22 to the hopper 24. In the form shown, the hopper 24 is of smaller cross-section than the largest cross-section of the housing 22. Consequently it is desirable for the housing 22 to taper towards its lower extremity or to have a funnel portion as at 22a for efficiently directing the material into the hopper 24.

Means are provided for controlling spider 12 for automatically stopping or arresting the flow of material from the hopper 10 in response to a predetermined weight of material comprising the bulk charge. Also means are provided for arresting a dribble flow in response to a second predetermined weight, the latter including both the dribble and the bulk charges.

In the embodiment illustrated in Fig. 1, the scale 25 is provided with a primary weight-responsive arm 27 which is adapted for moving in response to a bulk charge. A secondary weight-responsive arm 28 is operatively connected to the arm 27 in such a manner that it magnifies the motion thereof when arm 27 approaches the final predetermined weight of the complete charge.

The primary weight-responsive arm 27 of the scale 25 is mounted in a conventional manner as shown in Fig. 2a by means of a stationary cup 27a and a knife edge 27b resting in the cup. The weight of the charge is communicated to the arm 27 through the intermediary of a link 27c which acts upon a knife edge 27d. The secondary weight-responsive arm 28 is mounted in a manner analogous to that of main arm 27 and is operatively connected thereto by means of a flexible metal strip 28a which at one extremity is attached to the arm 27 and at the other is wound partly around a small drum 28b secured to the arm 28. The strip 28a preferably extends over this drum through approximately 180° whereby a downward thrust upon the strip will angularly shift the drum 28b and the arm 28 in a counterclockwise direction.

For a purpose to appear later, a suitable switch, for example, a magnetic mercury switch 29, to be described later, is mounted adjacent the arm 27 and is adapted for cooperating with a magnet 29a mounted upon the arm 27.

To the arm 27 there is attached a conventional cradle 30 upon which weights may be attached in a well known manner for predetermining the weight of the complete charge. The arm 27 is adapted for moving a predictable amount in response to the reception of a bulk charge within the hopper 24. When this movement has occurred, the magnet 29a moves into an effective position with reference to the switch 29 and actuates same to arrest the motion of the motor 16 and thus of the spider 12. Consequently, the stream of material is interrupted after a bulk charge has been received in hopper 24.

The motor 16 and the spider 12 are put in operation by manually pressing a button 16a (Figs. 1 and 4).

After the stopping of the spider 12, the screw 20 is put in operation by energizing the motor 21 by manually pressing a button 21a (Figs. 1 and 4). This places in operation the screw 20 which moves the material within the container 18 to the outlet 19 from which it falls into the hopper 24. The flow of material through the outlet 19 constitutes the dribble feed and is in a relatively smaller amount and at a slower rate than the bulk feed. After the dribble feed has increased the weight of the charge a predetermined small amount, the arm 28 will move to its predetermined central position at which time a magnet 31a is moved into operative association with a magnetic mercury switch 31, whereby the latter is opened which automatically deenergizes the motor 21 and thus arrests the dribble feed.

At this time a complete charge including the bulk and the dribble charge has been fed into the hopper 24. This complete charge is moved into a container such as a multi-wall paper bag by means of, for example, a packer screw 32 which extends into the hopper 24 and also into a conventional feed spout or tube 33.

The screw 32 can be rotated, for example, by an electric motor 85 in a manner to appear more fully hereinafter. Manual control for such an electric motor is indicated by the button 34 (Fig. 1).

If desired, a bag support and jigging device may be provided for settling the material which is fed into the bag.

In order to relieve the weighing mechanism from the stresses which occur during jigging, the platform of the scale 25 can be lifted from its knife edges in a conventional manner, for example, by means of a pedal 35 which is mounted upon a shaft 36, the latter having an arm 37 attached thereto for urging the platform of the scale upwardly and thus lifting the knife edges away from their supports.

An example of a magnetic mercury switch mentioned above is shown in Fig. 2 and comprises a tube 38, for example, of glass, having at the bottom thereof a pool of mercury 39 into which extends an electrical lead 40 which is permanently immersed therein. A second electrical lead 41 is suspended from a hair spring 42 which normally urges the conductor 41 into the pool of mercury 39. However, a magnet 43 can act upon the conductor 41 to urge same out of the pool of mercury in response to movement of the conductor 41 close enough to the field of said magnet. In order to facilitate the action of the magnet 43 upon the conductor 41, a small portion of magnetic material as at 44 can be attached to the conductor 41. Normally the switch is in the closed condition as shown in solid lines (with respect to the lead 41). This, of course, is the situation when the magnetic member 44 is relatively remote from the magnet 43. However, when member 44 moves into an operable position relative to magnet 43, the latter moves the former to the position shown in broken lines.

Fig. 4 illustrates one plan for electrically interconnecting the above-mentioned switches 16a, 21a with the bulk feed motor 16 and the dribble screw motor 21.

Motors 16 and 21 employ three-phase, sixty-cycle alternating current in the form shown. Input power lines 46, 47 and 48 are connected to a suitable source of electric energy (not shown) and are interconnected through a four-contact relay 49 to the motor 16. Interposed in the leads 46, 47 and 48 are three contacts or switches 50, 51 and 52 respectively. A fourth contact or switch 53 is interposed in the circuit of a control coil 54. The latter is adapted for actuating the contacts 50-53, inclusive. The purpose of the contact 53 is to create a "holding circuit" or "locking circuit" for the control coil 54 in a manner to appear more fully hereinafter.

The opening and closing of the contacts 50, 51 and 52, of course, controls the energization of the bulk feed motor 16, and the opening and closing thereof is governed by the above-mentioned control coil 54. The latter in turn can be controlled by the switch 16a indicated as the "fast" switch in Figs. 1 and 4, and also by the magnetic mercury switch 29 which cooperates with the magnet 29a.

In the form shown, the difference in potential between the input leads, such as 47, 48, is 440 volts. It is, of course, desirable to step-down this voltage in order to employ same safely across a small switch, such as 16a, the latter being connected to control the coil 54. Consequently, a transformer 55 is provided having a primary coil 56 which is connected across the input leads 47 and 48, via switches 51, 52, by means of electrical conduits 57 and 58. A secondary coil 59 of the transformer is connected to the motor relay control coil 54 through the intermediary of the switches 16a and 29. This is accomplished by means of a lead 60 extending to one side of the coil 54 and a lead 61 to one side of an emergency switch 62. The latter is provided in order to arrest the motion of electrical apparatus in the event of emergency, such as the breaking of a bag. The stop switch 62 on the opposite side thereof is connected by a lead 63 to the above-mentioned holding switch 53. The magnetic mercury switch 29 is interposed in the lead 63. One side of the switches 16a, 21a are also interconnected by the lead 63. Switch 16a on the opposite side thereof is connected to the coil 54 by means of a lead 16b to which there also is connected the above-mentioned lead 63. It will be noted that the contact 53 is interposed in the lead 63.

The dribble screw motor 21 is electrically connected to the input power leads and to the switches 21a and 62 as follows: Leads 46a, 47a and 48a are connected to the three-phase winding and respectively to said input power leads 46, 47 and 48. A dribble screw control relay 64 having four contacts analogous to 50-53, inclusive, is connected to the motor 21. Interposed in the leads 46a, 47a and 48a are three of said four contacts 65, 66 and 67, respectively, which are controlled by a relay coil 68. The fourth contact, 69, is also under the influence of coil 68 and constitutes a "holding" or "self-locking" contact for the circuit of said coil. When the latter is energized, the four contacts 65, 66, 67 and 69 are closed and the dribble screw motor is energized.

In order to arrest any tendency of the dribble screw 20 to coast when the dribble screw motor 21 is deenergized, a suitable brake 70 is associated therewith which is disengaged when the motor 21 is in operation. The brake 70 is disengageable by means of a solenoid 71 (Figs. 3 and 4) which is energized during the operation of the dribble screw motor. Solenoid 71 is connected across two of the power leads 47a, 48a by means of leads 72 and 73, respectively.

In the form shown in Fig. 3, brake 70 is constituted by a pair of brake shoes 74 and 75 which are mounted upon brake arms 76 and 77, respectively, said arms being pivotally mounted at one extremity thereof and opeartively associated with the solenoid 71 by a conventional linkage consisting of a bell crank 78 and an arm 79 as illustrated. A coil spring 80 normally urges the brake towards engagement with a suitable drum upon the shaft of the dribble screw. When the solenoid 71 is deenergized, the brake is effective to arrest the rotation of the dribble screw. However, when the solenoid is energized, core 71a thereof, being pivotally connected to the extremity of arm 78, is adapted for overcoming the spring 80 and disconnecting the brake.

Relay control coil 68 is governed as follows: it is connected to one side of the primary transformer coil 56 by means of a lead 81. The opposite side of said coil is directly connected, by means of a lead 82, to one side of the switch 21a, the latter being in connection with said coil 56 by means of the above-described lead 61. Thus a momentary closing of the switch 21a will energize the control coil 68 whereby all four of the contacts 65, 66, 67 and 69 are closed. Since the switch 21a normally is in an open position, except when manually depressed, the control coil 68 would, under normal circumstances, after manual closing of said switch become deenergized were it not for a locking circuit comprising a lead 83 which is connected at one extremity to the stop switch 62 and at the other extremity to the lead 82 via the above-mentioned magnetic mercury switch 31 and the holding contact 69. Control coil 68 will remain energized until the circuit thereof is broken by means of the magnetic mercury switch 31 or stop switch 62.

In operation of the embodiment shown in Fig. 1 employing the wiring diagram of Fig. 4, the apparatus at the outset is stationary, the switches 16a and 21a are open and the switch 62 is closed. In this condition, the bulk feed motor 16 and the dribble screw motor 21 are deenergized. Material such as sugar is contained in the supply bin 10 but it is restrained from flowing through the outlet 11 by means of the now stationary vaned spider valve 12, 14. In order to commence the flow of material from the supply bin the operator manually closes the normally open switch 16a momentarily. The momentary closing of this switch creates an electric circuit from the primary coil 56 through leads 61, 16b, control 54 and lead 60. The coil 54 thus is energized and the contacts 51-53, inclusive, are closed, thus energizing the bulk feed motor 16. Control coil 54 remains energized after switch 16a opens, by virtue of the locking contact 53 and its interconnection to the switch 16a by means of lead 63.

The bulk feed motor 16 rotates the spider 12 by means of the belt drive 17 and also rotates the agitator 10b in the bin 10 by means of a suitable interconnection. Material within the bin 10 slides through the outlet 11 and into the empty pockets formed by the angle members 13 as they move beneath said outlet. Each pocketful of material constitutes an increment which is moved to the outlet 14b where it is discharged, thus creating a stream of material therefrom. The trough 18 located beneath the outlet 14b thus is filled and overflows. The material of the stream issuing from outlet 14b which is not caught by the trough 18 constitutes the bulk flow which makes up the bulk charge. When a predetermined weight of material has fallen into the hopper 24 the primary scale arm 27 is moved, thus moving magnet 29a into operative association with the magnetic mercury switch 29 opening same. Thus the circuit of the control coil 54 is interrupted, all of the contacts 50-53, inclusive, are opened and the bulk feed motor stops. Consequently the flow of material from the supply bin 10 is interrupted.

Thereafter the operator momentarily manually closes the switch 21a whereby operation of the dribble screw motor is initiated in a manner analogous to that of the bulk feed motor 16. The solenoid 71 is energized concurrently with the dribble screw motor 21 whereby the dribble screw brake 70 is disengaged. The dribble screw 20 thus is rotated and a small dribble stream of material flows out of the opening 19 in the trough 18. When the desired exact weight is attained, the arm 28 and the magnet 31a attached thereto is shifted into proximity with the magnetic mercury switch 31 whereby the latter is opened and the circuit of the control coil 68 is interrupted. The contacts 65, 66, 67 and 69 of the relay 64 thus are immediately opened and the motor 21 is deenergized, together with the solenoid 71. The coil spring 80 of the dribble screw brake device now becomes effective to engage the brake and arrest the motion of the dribble screw promptly.

If desired, both of the switches 16a and 21a may be closed simultaneously at the outset of the operation of the apparatus whereby the formation of the bulk charge will be augmented by a discharge through outlet 19 of the trough 18, which discharge, of course, will persist after the spider 12 has been arrested and up to the time when a full charge is formed. When both spider 12 and dribble screw 20 are thus operated simultaneously a part of the bulk charge is constituted by a dribble flow. Inasmuch as the flow through outlet 14b is much greater than through outlet 19 there is no difficulty in keeping trough 18 filled to overflowing while spider 12 is rotated despite the operation of screw 20.

Thus, the scale 25 is responsive to a primary weight comprising the bulk charge and to a larger weight comprising the bulk charge plus the dribble charge.

Thereafter, the scale is locked or the platform of scale 25 is lifted off of the scale knife edges, control button 34 is pressed to energize motor 85 and thereby to rotate packer screw 32 and to move the charge into a bag on the spout 33. The bag settlor runs and stops, for example, in response to the movement of the packer screw 32.

Fig. 5 constitutes a wiring diagram for the apparatus shown in Fig. 1 wherein the vaned spider valve 12 is automatically stopped when the bulk charge has been fed to the hopper 24, as before, and thereafter automatic means initiate the operation of the dribble screw for the feeding of the dribble charge. When a complete charge has been fed to the hopper 24 and weighed by the scale 25, the dribble screw is automatically stopped and thereafter the packer screw 32 is automatically started whereby the full charge within the hopper 24 is moved into a valve bag fitted upon the spout 33. The packer motor thereafter is manually disconnected.

In the embodiment of Fig. 5 the bulk feed motor 16, the dribble screw motor 21 and a packer motor 85 are electrically so interconnected that an operator can initiate a complete filling cycle by a single momentary closing of a starting switch 86.

The bulk feed motor 16, as above, comprises a three-phase alternating current motor which is connected to a source of electric energy by means of the leads 46, 47, 48 as above described. A motor control relay 87 is also employed for governing the motor 16 and is analogous to the control relay 49. Control relay 87 is provided with four normally open contacts 88, 89, 90 and 91 which are closable by a control coil 92 when the latter is energized.

The dribble screw motor 21 is connected to said power leads by leads 46a, 47a and 48a, respectively, through a control relay 93 which is analogous to the control relay 64 above described. Control relay 93 is provided with a control coil 94 which is adapted for closing contacts 95, 96 and 97 when it is energized.

The electrical energy for energizing control coils 92 and 94 is obtained by means of a transformer 98 which is analogous to transformer 59 (Fig. 4). A primary transformer coil 99 is connected by suitable leads across the electrical conduits 47a and 48a intermediate the power source and the contacts 96 and 97, whereby the primary coil 99 is at all times energized except when a master disconnect switch 100 is open.

A secondary coil 101 of the transformer 98 is electrically connectable to the relay control coils 92 and 94 as follows: The transformer secondary coil 101 can be placed in circuit with the control coil 92 by means of leads 102, 103, start switch 86 (normally open) leads 104 and 105. Once the switch 86 is momentarily closed, a holding circuit is formed by means of the holding contact 91 and a lead 106 which interconnects the latter to one side of the start switch 86.

Interposed in the lead 102 is a stop switch 107 which is analogous to the stop switch 62 and is adapted for deenergizing any of the electric motors in a manner which will appear more fully hereinafter.

The transformer secondary coil 101 can be placed in circuit with the control coil 94 by means of said lead 102, the stop switch 107, a lead 108 to the coil 94 and a lead 109 from the coil 94 back to the secondary coil 101. Interposed in the lead 108 is a contact 110 which normally remains open but which is closed in response to the reception of a bulk charge in the hopper 24. The control of the contact 110 is accomplished by means of a relay 111 having a control coil 112 which operates in a manner to appear more fully hereinafter. The control coil 112 also governs another contact 113 which normally is in a closed condition. Contact 113 is interposed in the lead 105. Thus the relay 111 is provided with a pair of contacts, one of which is normally opened (110) and one of which is normally closed (113). Energization of the control coil 112 will open the normally closed contact 113 and will close the normally open contact 110.

The relay 111 thus constitutes a means for stopping the bulk feed motor 16 by breaking the circuit to the control coil 92, and also a means for simultaneously starting the dribble screw motor 21 by closing contact 110. The energization of the control coil 112 is governed in response to the closing of magnetic mercury switch 29b which is analogous to the above-described switch 29 with the exception that it is normally open instead of normally closed. When the bulk charge has been received in the hopper 21, the arm 27 moves magnet 29a into closing relationship with switch 29b and the coil 112 is energized. This is accomplished by the following circuit: The coil 112 is connected to the secondary coil 101 of the transformer 98 by means of the lead 102, switch 107, leads 103, 106, 114, contact 119, leads 115, 116 and 105. The magnetic mercury switch 29b can be interposed, for example, in the lead 114.

In order to insure that vibrations of the mercury in switch 29b or of the contacts will have no effect upon the circuit once said mercury switch is closed, a relay 117 is employed, for example, between leads 114 and 115. This relay is provided with two contacts 118 and 119 and a control coil 120. The contact 118 is a holding or self-locking contact for the relay and the contact 119 is for making and breaking the circuit between the leads 114 and 115 in response to the state of energization of the control coil 120.

The energization of said control coil 120 in turn is governed by another relay 121 which serves the two following main function: (1) it provides an emergency control over the dribble motor 21 because it is so connected to the emergency stop switch 107 that when the latter is momentarily opened, the contacts of relay 121 are opened, thus making it impossible to energize relay 117 and thus making it impossible to complete the circuit of the dribble screw motor control coil 94; (2) it also provides a means for arresting the dribble screw motor 21 in response to the reception of a complete charge (bulk plus dribble) in the hopper 24. This is accomplished by deenergizing the relay 121 in response to the opening of the magnetic mercury switch 31 in a manner to appear hereinafter.

The relay 121 is provided with contacts 122 and 123, and with a control coil 124. The latter is energized by a momentary closing of the start switch 86 by virtue of a lead 125 connected to said switch and to the coil 124. A lead 126 interconnects said coil 124 back to the secondary transformer coil 101. Thus a momentary closing of the start switch 86 effects a circuit to the coil 124 via lead 102 from transformer 98, switch 107, lead 103, start switch 86, leads 125 and 126.

The contact 122 constitutes a holding contact which effects a holding circuit for the coil 124 after the normally open start switch has been released and is open. This holding circuit with reference to the secondary transformer coil 101 is effective through said lead 102, stop switch 107, lead 103 and leads 127, 128.

The main contact of the relay 121, of course, is contact 123 which is interposed in the circuit of the control coil 120 whereby said contact governs the energization of said control coil. The circuit from the secondary coil 101 of the transformer through said control coil 120 and contact 123 is as follows: Lead 102, stop switch 107, leads 103, 106, contact 91, lead 114, mercury switch 29b, lead 120a, coil 120 and lead 120b. Said contact 123 is interposed in the lead 120b.

From the above it is seen that an opening of the magnetic mercury switch 31 in response to the reception of a full charge will deenergize relays 121 and 117 thereby deenergizing relay 112 and stopping the dribble feed motor. The sequence of events is as follows: (1) magnetic mercury switch 31 is opened in response to a full charge being received in the hopper 24; (2) the holding circuit of the relay 121 thus is interrupted. This deenergizes the control coil 124, thus opening the contact 123; (3) the control coil 120 of relay 117 is thereafter deenergized by virtue of the opening of the contact 123. This opens the circuit to the relay control coil 112 because of the opening of the contact 119; (4) upon the deenergization of control coil 112, the contact 110 is opened, control coil 94 is deenergized, and the dribble screw motor thereafter is stopped.

The above-mentioned packer motor 85 is connected into the above circuit in such a manner that it is energized immediately after the opening of the magnetic mercury switch 31. That is, it is energized immediately after the arresting of the dribble screw motor as caused by the reception of a full charge in the hopper 24. This energization of the motor 85 is automatic. However, its deenergization is not automatic in this embodiment and must be accomplished by a manual operation, namely, the momentary opening of the stop switch 107.

Motor 85, in the form shown, also is a three-phase alternating current motor, the phases of which are connected to the power line by the above-mentioned leads 46a, 47a and 48a. A control relay 129 is employed for governing this motor which is analogous to the above-described relay 87 employed in connection with the bulk feed motor 16. That is, the control relay 129 has four contacts 130, 131, 132 and 133 which are under the influence of a control coil 134 which closes them when it is energized.

The control coil 134 is in circuit with the secondary coil 101 of the transformer 98 through the intermediary of a contact 135 and another contact 136. The former is normally open but is closable in response to a momentary closing of the start switch 86 and is openable in response to a momentary opening of the stop switch 107. Thus, a manual control is obtained over the motor 85 by means of the stop switch 107. That is, in an emergency, the packer motor 85 can be stopped by opening the stop switch 107. Also after the packer has filled a bag, motor 85 can be stopped manually by opening said stop switch.

The contact 135 constitutes a part of a relay 137 and is under the influence of a control coil 138 to which is connected a holding or self-locking contact 139.

The above-mentioned contact 136 constitutes a part of a relay 140 and is under the influence of a control coil 141. The relay 140 provides appropriate means for starting the packer motor 85 in response to: (1) the reception of a full charge in the hopper 24; and (2) the stopping of the dribble screw motor 21.

The electric circuit from the secondary coil 101 through the control coil 134 and back to the said secondary coil is through the following connections: lead 102, stop switch 107, a lead 142, a lead 143, contact 136, contact 135, control coil 134 and a lead 144.

Upon the closing of the start switch 86, the relay 137 is immediately energized and the contact 135 is closed. However, the circuit to the motor control coil 134 remains interrupted until the closing of the contact 136 in response to a full charge having been received in the hopper 24. The control coil 138 of the relay 137 is connected at one side thereof to the start switch 86 by means of a lead 145 and the other side thereof is connected by a lead 146 to the lead 144 whereby a circuit is completed from the primary coil 101 through the control coil 103 and back to the primary coil. A holding circuit for the relay 137 is effected by means of the above-mentioned contact 135 which is connected to the lead 143 by a lead 147. Thus a momentary closing of the start switch 86 will energize the coil 138 and thereafter the holding circuit via the lead 147 will take charge, permitting a continued energization of the coil 138 until the interruption of the holding circuit by the opening of the stop switch 107.

As above mentioned, the relay 140 is under the influence of the magnetic mercury switch 31. The contact 136 of this relay is normally in a closed position and is opened in response to the energization of the control coil 141. The latter is so connected that it will become energized immediately when the disconnected switch 100 is closed, thereby opening the contact 136. This is accomplished by connecting the control coil 141 across the leads 144 and 127. Leads 148 and 149 are employed for this purpose respectively.

In operation of the embodiment employing the wiring diagram of Fig. 5 the operator of the machine first makes sure that sufficient material is within the hopper 10 to complete a filling cycle. The disconnect switch 100 thereupon is closed which produces the following results: (1) the transformer 98 is energized; and (2) the control coil 141 of the relay 140 is energized thereby opening the contact 136 and preventing the actuation of packer motor 85.

The operator thereafter momentarily closes the start switch 86 which produces the following effects:

(1) The control coil 92 of the bulk feed motor 16 is energized, the above-mentioned holding circuit being effective to continue the energization of this coil. The contacts 88—91, inclusive, thus are closed and the bulk feed motor 16 becomes operative. A stream of material flows through the outlet 14b in the manner above described, thereby filling the trough 18. When a bulk charge has been received in the hopper 24, the arm 27 moves a sufficient amount to bring the magnet 29a into operative association with the normally open magnetic mercury switch 29b, thus closing same.

(2) Said momentary closing of the start switch 86 also energizes the control coils 124 and 138 of the relays 121 and 127, thereby closing the contacts 123 and 135 for a purpose to appear more fully hereinafter. The holding circuits for such relays are effective to maintain the energization of their respective control coils.

The closing of the normally open magnetic mercury switch 29b has the effect of energizing the control coil 120 of the relay 117 and thus of completing an electric circuit to the control coil 112 of the relay 111. This is done via the leads 115, 116 and 105.

The energization of control coil 112: (1) breaks the control circuit of the bulk feed motor 16 by opening contact 113; and (2) closes the control circuit to the dribble screw motor 21 by closing the contact 110. Thus the bulk feed motor 16 is immediately stopped and the dribble screw motor 21 is started.

The dribble screw motor 21 operates in the manner above described to feed a dribble charge through the outlet 19 into the hopper 24. When a full charge has been received in said hopper, the arm 28 moves the magnet 31a into operative proximity with the normally closed magnetic mercury switch 31 and opens same. The opening of switch 31 has the following results:

(1) The dribble screw motor is stopped as follows: The holding circuit of the relay 121 is broken, control coil 124 is deenergized, contact 123 is opened, control coil 120 is deenergized, and contact 119 is opened thereupon deenergizing the relay 111. This immediately breaks the control circuit of the dribble screw motor 21 by opening the contact 110. The dribble screw motor stops.

(2) The packer motor is started as follows: The control coil 141 of the relay 140, being in circuit with the magnetic mercury switch 31 is immediately deenergized and contact 136 returns to its normally closed condition, thereby energizing the control coil 134 and starting the packer motor 85.

After the magnetic mercury switches have made or have broken a circuit any vibration of the mercury and/or the contacts associated therewith will have no effect.

The packer motor continues in operation until the contents of the hopper 24 have been fed into a bag, the valve of which is fitted onto the spout 33. When the filling cycle is completed, the operator, in order to stop the packer motor 85, must open the stop switch 107, thereby deenergizing the control coil 138 of the relay 137 which opens contact 135 and thus interrupts the circuit of the control coil 134 and stops the packer motor.

It is desirable for the above-mentioned settler or jigger to be operating concurrently with the rotating of the packer screw 32.

While the invention has been described with respect to certain preferred examples which have given satisfactory results, it will be understood by those skilled in the art after understanding the invention that various changes and modifications may be made without departing from the spirit and the scope of the invention, and it is intended, therefore, in the appended claims, to cover all such changes and modifications.

What is claimed is:

1. In apparatus of the class described, a supply bin, a valve for controlling a flow of material out of said bin, a container spaced from said bin and having an inlet located in the path of such material after it has flowed out of said bin whereby the latter can be filled and can overflow when said valve is operated to release a sufficient quantity of material, means for dribbling the contents out of said container, a receptacle beneath said bin and container for collecting material falling therefrom, weighing apparatus operatively connected to said receptacle for measuring the weight of material thereon, mechanism for governing said valve in response to a first preselected weight of material being received upon said receptacle, said first preselected weight comprising a bulk charge, and means for arresting a flow of material from said container in response to a second preselected weight of the material being received upon said receptacle comprising a bulk charge plus a dribble charge.

2. In apparatus of the class described, a trough having an outlet, a supply bin for holding material, valve means for controlling a stream of material from said bin, said trough being located in the path of such stream of material after it has flowed out of said bin for the collection of material for a dribble stream, the trough being fillable to overflowing by such stream, trough emptying mechanism for moving material in said trough through the outlet thereof to create the dribble stream, a scale having a receptacle for receiving the streams of material from said bin and trough, mechanism responsive to a first preselected weight of material received on the receptacle for shutting said valve means, and mechanism responsive to a preselected additional weight of material added to the first preselected weight of the material for arresting said trough emptying mechanism.

3. In apparatus of the class described, a supply bin of material, a valve for controlling a flow of material from said bin, a container disposed beneath said valve and having an inlet for receiving material which falls therefrom, a dribble mechanism for dribbling out the contents of said container, said container being fillable to overflowing by a stream of material from said bin, a receptacle for collecting material discharged from said bin and container including material overflowing from the latter, a weighing device operatively associated with said receptacle for weighing material collected on the latter, mechanism for shutting said valve in response to a first preselected weight of material comprising a bulk charge being received upon said receptacle, and mechanism for arresting said dribble mechanism in response to a second preselected weight of material comprising the bulk plus dribble charges being received upon said receptacle.

4. In apparatus of the class described, a bin, flow control means for governing a flow of material from said bin, a container spaced from said bin and interposed in the path such material will follow after falling from said bin, said container having an outlet and an inlet, mechanism for urging material to move out of said container through said outlet, said container being positioned for receiving material from said bin through the inlet, a receptacle positioned for receiving material flowing from said bin and container including material overflowing from the latter and having a weighing device associated therewith for measuring the weight of material on the receptacle, means for actuating said flow control means for arresting the flow of material therefrom in response to a first predetermined weight of material received on said receptacle, means for actuating said mechanism to urge material to move out of said container, and means for arresting said last-named mechanism in response to a second and greater predetermined weight of material received on said receptacle.

5. In apparatus of the class described, a bin, flow control means for governing a stream of material flowing from said bin, a container situated beneath said bin in spaced relation thereto for receiving such stream after discharge from said bin, a discharge mechanism for said container for discharging the contents thereof, a collector beneath said container and positioned for receiving material which has overflowed from and which is discharged from said container, a scale operatively connected to said collector for weighing material received thereon, means for actuating said flow control means, means for arresting a flow of material from said bin in response to a first predetermined weight of material received on the collector comprising a bulk charge, means for arresting said discharge mechanism in response to another predetermined weight of material received on the collector comprising the bulk charge plus a dribble charge.

6. In apparatus of the class described, a bin having an outlet, a container positioned in spaced relation to and below said bin for receiving a stream of material flowing out of such outlet, said container having an outlet, a container discharge mechanism for discharging the contents of the container therefrom, a receptacle positioned for receiving material from said bin and container, the latter being fillable to overflow whereby an overflow stream of material falls therefrom, a scale operatively associated with said receptacle for weighing material therein, means for shutting off the flow of material from said bin in response to a predetermined weight of material measured by said scale, and means for arresting said discharged mechanism in response to a further predetermined weight of material measured by said scale.

7. In apparatus of the class described, a bin, a vaned spider beneath said bin, a housing for said spider having an opening at the bottom thereof, a trough beneath the opening in said housing, said trough having an outlet therein, a dribble feed screw in said trough adapted for moving material therefrom through the outlet, said trough being fillable to overflowing whereby an overflow stream of material falls therefrom, a packer mounted beneath said trough, a conduit providing a passage member for overflow material and material passed through the outlet from said trough to said packer, weight responsive means operatively associated with said packer for controlling said spider in response to a first preselected weight of material received by said packer including the overflow material from said trough, and means operatively associated with said weight responsive means for controlling said dribble feed screw in response to an additional preselected weight of material, the latter having passed through the trough outlet and added to the first preselected weight of material.

8. In apparatus of the class described, a supply bin having an outlet, a vaned spider valve situated beneath said bin, a trough having an opening, said trough being positioned to receive material from said bin through said valve and being fillable to overflowing where an overflow stream of material falls therefrom, weight-responsive means having a structure for receiving a charge of material from said bin and trough, means for stopping said spider in response to the reception upon the charge receiving structure of a predetermined weight of material including the overflow from the trough, a trough discharge device for moving the material in said trough to the opening therein through which it falls onto the charge receiving structure, and means for stopping said trough discharge device in response to a preselected weight greater than the predetermined weight first mentioned.

9. In apparatus of the class described, a supply bin for material, a valve for controlling material flow from said bin, a packer, a passageway interconnecting said bin and packer, a trough in said passageway and fillable by material moving therein, the material overflowing said trough and thereafter moving to said packer through said passageway, weight-responsive means for supporting said packer, means for controlling said valve for shutting off the flow of material in response to a predetermined weight of material on said weight-responsive means, means for urging the material from said trough, and means for rendering inoperative said last named means in response to a second predetermined weight of material on said weight-responsive means.

10. In apparatus of the class described, a bin, a bin valve for controlling the movement of material from said bin, weight-responsive means having a charge receiving structure, a conduit for providing a passage for material flowing from said bin to the charge receiving structure, a container in said conduit having an inlet and positioned to receive material moving therein from said bin and also having an outlet, dribble mechanism for controlling the movement of material through said outlet, said container being of smaller cross-sectional area than the cross-sectional area of said conduit whereby material may fill said container and overflow therefrom to reach said charge receiving structure, a bin valve actuator operatively connected to said weight-responsive means for controlling said bin valve in response to a first predetermined weight constituting the weight of a bulk charge including material overflowing from said container, and a dribble mechanism governor operatively connected to said weight-responsive means for arresting said dribble mechanism in response to a second predetermined weight comprising the weight of the bulk plus a dribble charge.

11. In apparatus of the class described, a bin, flow control means for governing a flow of material from said bin, a scale for measuring weight, a passageway interconnecting said bin and scale through which material may move for weighing upon the scale, a container supported in said passageway adapted for receiving material moving therein, said container having an outlet, mechanism for urging material to move out of said container through said outlet at a predetermined rate, said container being adapted for being filled by material and thereafter for overflowing whereby the overflow moves to the scale as part of a bulk charge, means for actuating said flow control means to stop the flow of material from said bin in response to a predetermined weight of a bulk charge upon said scale, means operable thereafter for actuating said mechanism for urging material to move out of said container, and means for arresting said last-named mechanism in response to a further predetermined weight upon the scale comprising the weight of the bulk charge plus a dribble charge.

12. In apparatus of the class described, a container for receiving material, said container having a primary opening therein comprising an inlet for material flowing therein and an outlet for material overflowing therefrom, the overflowing occurring when the material has substantially reached the level of said opening, said container having a secondary opening for a flow of material therethrough, mechanism for governing a flow of material through the secondary opening, a valve for controlling a stream of material directed toward said container at least a portion of which stream of material passes into the container through the primary opening thereof, said valve being positioned above and in spaced relation to said container, a scale having a collector for receiving material which passes said container, a valve actuator operatively connected to said scale for controlling said valve for shutting off material to said container in response to a first predetermined weight upon said scale, and means operatively interconnecting said flow governing mechanism and scale for terminating material flow through the secondary opening of said container in response to a further predetermined weight upon said scale, said valve being constructed and arranged for governing a large flow of material, and said flow governing mechanism being constructed and arranged for controlling a relatively small flow of material.

13. In apparatus of the class described, a container having an inlet in an upper part and an outlet in a lower part thereof, an outlet flow control device for governing material flow through the container outlet, valve means for controlling a flow of material toward the inlet, said container being fillable to overflowing whereby an overflow stream of material falls therefrom, a scale having a charge receiving structure beneath said container for receiving material overflowing from said container and also falling therefrom through the outlet therein, means associated with said valve means and operatively connected with said scale for shutting off a flow of material to the container in response to a first predetermined weight upon said scale, and means for governing said outlet flow control device for shutting off a flow of material from said outlet in response to a second predetermined weight upon said scale said valve means being spaced above said inlet.

14. In apparatus of the class described, a supply bin having an outlet, valve means for controlling a flow of material from said bin, manually operable means for actuating said valve means for initiating a stream of material therethrough, a container spaced below such outlet located in the path of such stream, said container having an inlet through which the material of the stream can flow, said container also having an outlet through which a dribble stream of material can flow, discharge means for controlling a flow of material from said container through the outlet, a scale, a packer positioned beneath said container upon said scale and having a hopper for receiving streams of material from said bin and container, said packer including means for moving material from the hopper into a bag in filling relation therewith, the stream of material from said bin being adapted for filling said container and overflowing therefrom, the material from said bin which passes said container including overflow material therefrom comprising a flow from which a partial charge is measured, means for automatically shutting off said valve means in response to the reception in the hopper of a first predetermined weight of material comprising a partial charge, means for automatically actuating said container discharge means also in response to the reception of the partial charge in the hopper, said discharge means being effective to create a stream of material from said container into the hopper, mechanism for automatically arresting said container discharge means in response to the reception in the hopper of an added predetermined weight the total weight in the hopper comprising a full charge, and a packer actuator for automatically actuating the means for moving the material out of said hopper and into the bag also in response to the reception in said hopper of the full charge.

15. In apparatus of the class described, a bin having an outlet; a valve for controlling a stream of material from said bin through the outlet; a trough in spaced relation to and below such outlet and in the path of material falling from said bin through such outlet, such trough being adapted for collecting a sufficient quantity of material therefrom to constitute at least a complete dribble charge, said trough having an inlet thereof in said stream and having an outlet in the bottom thereof and being fillable to overflowing; an impeller for creating a dribble flow of material through the outlet; a scale having a receptacle for receiving material from said bin and said trough including the overflow material from said trough; manually operable means for opening said valve for initiating a flow of material therethrough, said flow of material filling said container and overflowing therefrom; means for automatically closing said valve in response to the reception of a bulk charge of preselected weight by said scale, an impeller actuator operatively connected to said scale for automatically initiating the operation of said impeller whereby a dribble stream is initiated through the outlet in said trough and is directed toward said receptacle in response to the reception upon said scale of the bulk charge, and an impeller arrestor also operatively connected to said scale for stopping the impeller in response to the reception upon said scale of a full charge including the bulk charge and a dribble charge of predetermined weight.

16. In apparatus of the class described for weighing both large and relatively small portions of a full charge of material, the combination comprising a container having an inlet in an upper part and an outlet in a lower part thereof, an outlet flow control device for governing a relatively small material flow through said outlet, feeder means positioned above said container for feeding a relatively large stream of material from a source of supply to said container through said inlet thereof, said container being spaced below such feeder means positioned in the path of said stream and being fillable thereby to overflowing whereby an overflow stream of the material is provided, a weight responsive device having a charge receiving structure positioned for receiving material overflowing from said container and also flowing therefrom through the outlet therein, a feeder actuator operatively associated with said feeder and weight responsive device for shutting off said feeder in response to a first predetermined weight of material upon said weight responsive device, such weight of material constituting the larger portion of the full charge of material, and control means for said outlet flow control device operatively connected to said weight responsive device for shutting off the flow of material through said container outlet in response to a second predetermined weight of material upon said weight responsive device, such second weight of material constituting the larger portion of the full charge plus said smaller portion of such charge.

HERMAN S. RHODES.

REFERENCES CITED

The following references are of record in the file of this patent:

UNITED STATES PATENTS

| Number | Name | Date |
|---|---|---|
| 615,201 | Richards | Nov. 29, 1898 |
| 615,496 | Richards | Dec. 6, 1898 |
| 994,265 | McLeod | June 6, 1911 |
| 1,107,592 | Dewey | Aug. 18, 1914 |
| 1,259,836 | Close | Mar. 19, 1918 |
| 1,667,858 | Hartman | May 1, 1928 |
| 1,790,366 | Cooper et al. | Jan. 27, 1931 |

FOREIGN PATENTS

| Number | Country | Date |
|---|---|---|
| 843,683 | France | July 7, 1939 |